US009276723B1

(12) United States Patent
Mansour

(10) Patent No.: US 9,276,723 B1
(45) Date of Patent: Mar. 1, 2016

(54) SYSTEMS AND METHODS OF TRANSMISSION OF USER DATA PACKETS

(75) Inventor: Nagi Mansour, Arlington, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 2341 days.

(21) Appl. No.: 12/118,917

(22) Filed: May 12, 2008

(51) Int. Cl.
*H04B 7/00* (2006.01)
*H04L 5/00* (2006.01)

(52) U.S. Cl.
CPC .................................... *H04L 5/0053* (2013.01)

(58) Field of Classification Search
None
See application file for complete search history.

(56) References Cited

U.S. PATENT DOCUMENTS

| | | | | |
|---|---|---|---|---|
| 6,363,065 | B1 * | 3/2002 | Thornton et al. | 370/352 |
| 7,372,893 | B2 * | 5/2008 | Park et al. | 375/147 |
| 7,411,924 | B2 * | 8/2008 | Cho et al. | 370/328 |
| 7,480,497 | B2 * | 1/2009 | Biswas et al. | 455/168.1 |
| 7,526,038 | B2 * | 4/2009 | McNamara | 375/267 |
| 7,545,772 | B2 * | 6/2009 | Hwang et al. | 370/329 |
| 7,639,660 | B2 * | 12/2009 | Kim et al. | 370/343 |
| 7,657,244 | B2 * | 2/2010 | Niu et al. | 455/277.1 |
| 7,720,020 | B2 * | 5/2010 | Larsson | 370/315 |
| 7,746,886 | B2 * | 6/2010 | Hansen et al. | 370/437 |
| 7,792,088 | B2 * | 9/2010 | Ahn et al. | 370/344 |
| 8,116,293 | B2 * | 2/2012 | Walton et al. | 370/343 |
| 2005/0013272 | A1 * | 1/2005 | Hwang et al. | 370/328 |
| 2005/0015511 | A1 * | 1/2005 | Izmailov et al. | 709/238 |
| 2006/0050627 | A1 | 3/2006 | Etemad et al. | |
| 2006/0120477 | A1 * | 6/2006 | Shen et al. | 375/267 |
| 2007/0010237 | A1 * | 1/2007 | Jones et al. | 455/422.1 |
| 2007/0072570 | A1 * | 3/2007 | Hottinen et al. | 455/277.2 |
| 2008/0253469 | A1 * | 10/2008 | Ma et al. | 375/260 |
| 2010/0023830 | A1 * | 1/2010 | Wengerter et al. | 714/748 |
| 2010/0061345 | A1 * | 3/2010 | Wengerter et al. | 370/335 |

OTHER PUBLICATIONS

Eli Sofer etc., 22-05-0005-00-0000_OFDMA_Tutorial_IEEE802-22_Jan. 5.*

* cited by examiner

*Primary Examiner* — Fan Ng

(57) ABSTRACT

Systems and methods of wirelessly transmitting user data are provided. A plurality of wireless communication devices are selected for a user data packet. Distinct user data is included for each of the plurality of wireless communication devices in the user data packet. Portions of the user data packet including the user data for each of the plurality of wireless communication devices are identified. The user data packet is then transmitted over a wireless air interface.

7 Claims, 5 Drawing Sheets

OFDM Symbol Number
Sub-Channel Number
Preamble
FCH
DL-MAP
UL-MAP
DL Data Bursts
UL Data Bursts
Ranging sub-channel
DL
UL
5 ms Frame

WIMAX Frame Structure in TDD Mode

SYSTEMS AND METHODS OF TRANSMISSION OF USER DATA PACKETS

BACKGROUND OF THE INVENTION

Wireless communication systems typically provide at least one control channel and one or more traffic channels for transmitting and receiving information in packets. The control channels carry control information, which is distinct from user data carried in the traffic channels. The user data can be voice or data information. In wireless communication systems information is typically transmitted in packets. The packets are modulated and transmitted in accordance with a multiple access communication technique, such as Frequency Division Multiple Access (FDMA), Time Division Multiple Access (TDMA), Code Division Multiple Access (CDMA), Orthogonal Frequency Division Multiple Access (OFDM), and the like.

Wireless communication systems typically implement a multiple access communication technique in accordance with a particular industry standard. For example, in the United States wireless communications employing TDMA typically conform to the IS-54 standard, whereas wireless communications employing CDMA typically conform to, for example, the IS-95 standard. Each standard defines, among other things, the size of user data packets employed for traffic channels. Once defined by a standard, the size of the user data packets carried by the traffic channels typically does not vary. Thus, the decision of the user data packet size for each standard requires careful consideration of a number of factors, including whether the user data packets will carry voice or data. User data packets carrying voice information tend to be smaller than user data packets carrying data because user data packets carrying voice information typically are not retransmitted, and accordingly a lost voice packet must not be noticeable to the receiver of the packet. Moreover, a high perceived Quality of Service (QoS) for voice information requires the frequent transmission of smaller packets compared to the less frequent and larger packets employed for data.

SUMMARY OF THE INVENTION

Exemplary embodiments of the present invention are directed to systems and methods of wirelessly transmitting user data. A plurality of wireless communication devices are selected for a packet. Distinct user data for each of the plurality of wireless communication devices is included in the packet. Portions of the packet including the user data for each of the plurality of wireless communication devices are identified, and the packet is transmitted over a wireless air interface. The distinct user data can be, for example, voice information.

Exemplary embodiments of the present invention are also directed to systems and methods of wirelessly receiving user data. One of a plurality of wireless communication devices receives a packet that includes user data for each of the plurality of wireless communication devices. The wireless communication device demodulates the packet and selects user data addressed to the one of the plurality of wireless communication devices.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Exemplary embodiments of the present invention involve transmission of user data packets in wireless networks that employ orthogonal frequency division multiplexing (OFDM), such as a WiMAX network.

Figure 1:
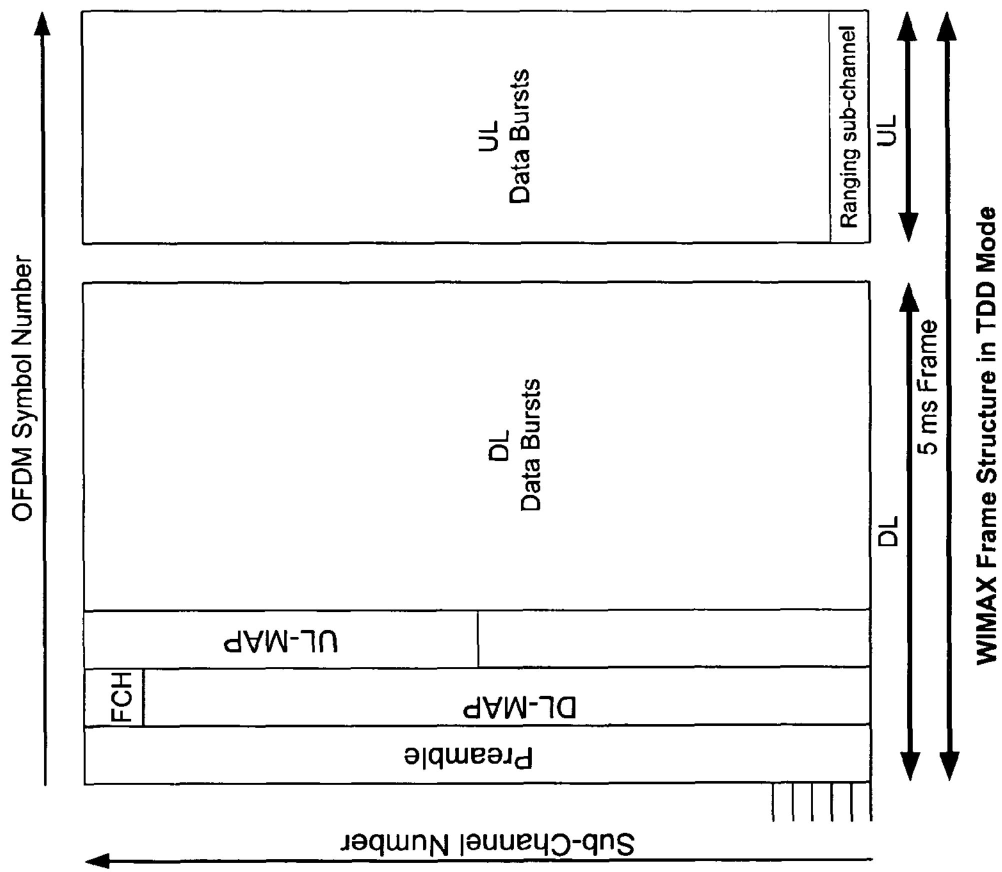
FIG. 1 is a block diagram of an exemplary WiMAX time division duplex (TDD) frame.

FIG. 1 is a block diagram of an exemplary WiMAX time division duplex (TDD) frame. The frame structure begins with a preamble that is used for physical layer procedures, such as time and frequency synchronization and initial channel estimation. The downlink (DL) preamble is followed by a frame control header (FCH) that provides frame configuration information, such as MAP message length and the usable sub-carriers. Multiple users are allocated data regions within the frame, and these allocations are specified in the uplink and downlink messages (DL-MAP and UL-MAP). In the TDD operation using a 10 MHz channel, the frame has an allocation in time of 48 symbols and an allocation in frequency using 1024 sub-carriers. For the downlink/uplink ratio of 3:2 there will be 22:15 data symbols with the rest of the frame used for preamble and control channels. Symbols and subcarriers are resources that can be assigned to users.

For example, in a WiMAX system that uses a 10 MHz channel, 840 sub-carriers are used to carry user data and pilots in the uplink. The downlink (DL) portion of the frame includes 30 sub-channels, each sub-channel (when employing PUSC), includes 24 user data sub-carriers and 4 pilot sub-carriers. A user data packet is spread across a number of non-adjacent sub-carriers (also referred to as frequencies) to form a sub-channel.

Figure 2:
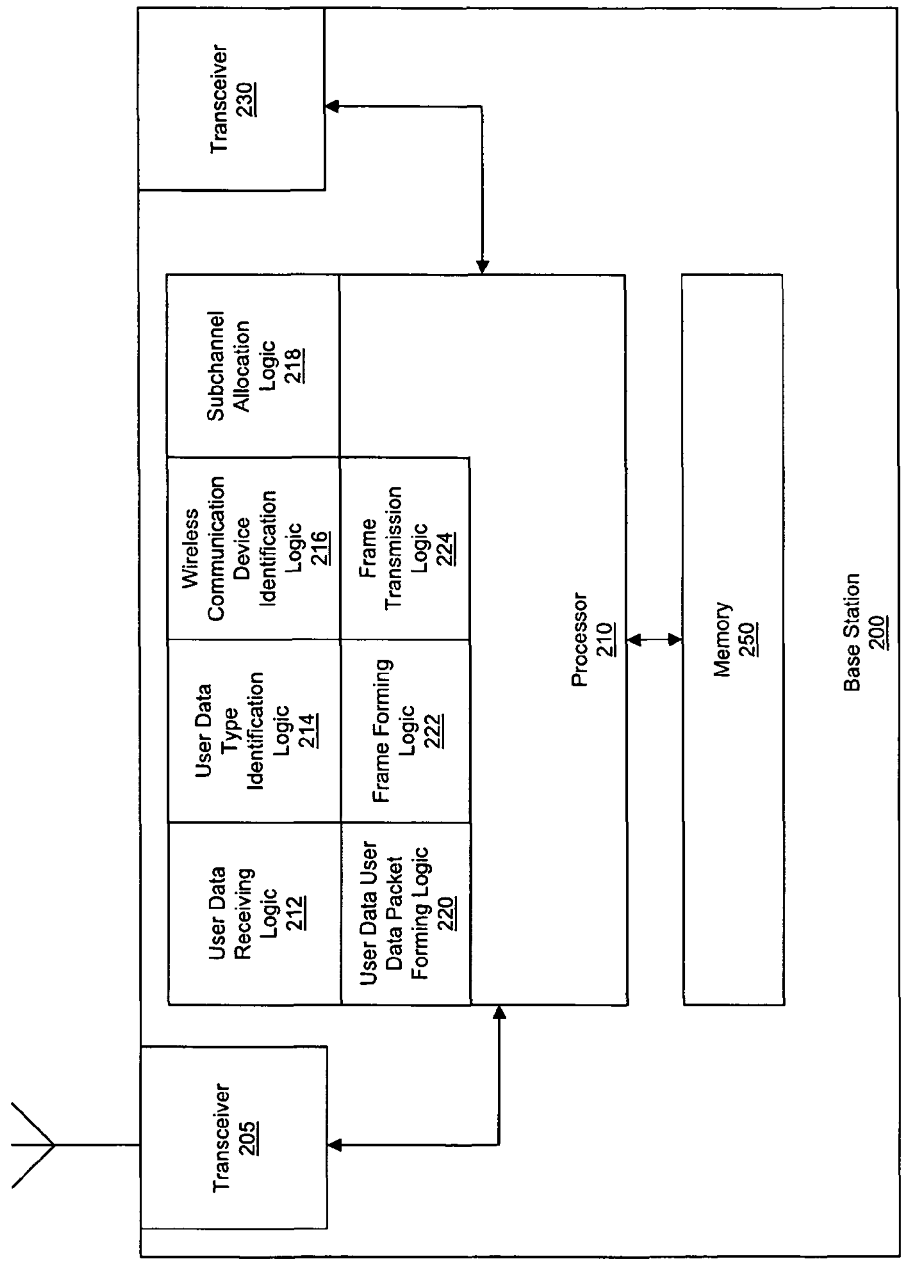
FIG. 2 is a block diagram of an exemplary base station in accordance with the present invention.

FIG. 2 is a block diagram of an exemplary base station in accordance with the present invention. Base station 200 includes transceiver 205 coupled to an antenna for transmitting and receiving communications with wireless communication devices. Transceiver 205 is also coupled to processor 210, which is in turn coupled to memory 250. Processor 210 is coupled to transceiver 230 for transmitting and receiving information with the wireless network infrastructure. Processor 210 includes logic 212-224, which will be described in more detail below in connection with FIG. 3. Processor 205 can be any type of processor, such as a microprocessor, field programmable gate array (FPGA) and/or an application specific integrated circuit (ASIC). When processor 210 is a microprocessor then logic 212-224 can be processor-executable code loaded from memory 250. It will be recognized that FIG. 2 is a simplified diagram of the base station, and the base station can include other components, such as downconverters, upconverters, digital-to-analog converters, analog-to-digital converters, etc.

Figure 3:
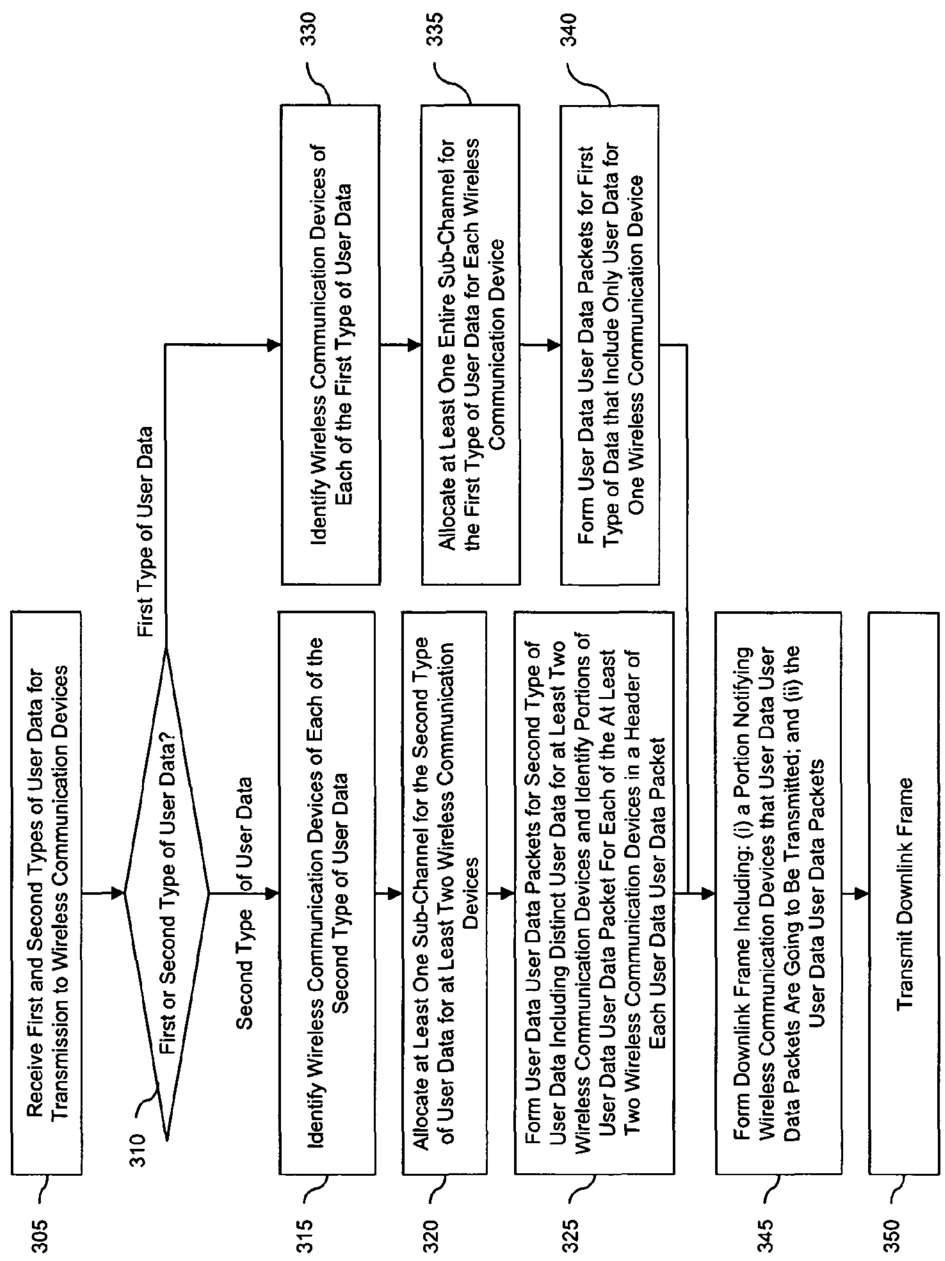
FIG. 3 is a flow diagram of an exemplary method of transmitting information in accordance with the present invention.

FIG. 3 is a flow diagram of an exemplary method of transmitting information in accordance with the present invention.

Initially, logic 212 of base station 200 receives first and second types of user data for transmission to wireless communication devices supported by the base station (step 305). The first type of user data can be data information and the second type of user data can be voice information. The voice information can be formatted using any type of format, such as Voice over Internet Protocol (VoIP). This data can be received from the network infrastructure via transceiver 230 and/or from wireless communication devices by way of transceiver 205. Logic 214 then identifies the type of user data received by way of one of the interfaces (step 310).

For the second type of user data logic 216 identifies a number of wireless communication devices for this type of user data (step 315). The identification of wireless communication devices can be based on, for example, wireless communication devices that are located in similar geographical areas, such as within a particular sector, and/or wireless communication devices experiencing similar channel conditions and thus having similar carrier to interference-plus-noise ratios (CINRs). Logic 218 then allocates at least one sub-channel for the second type of user data for at least two of the identified wireless communication devices (step 320). Logic 220 forms packets for the second type of user data by including distinct user data for at least two wireless communication devices, and by identifying portions of the packet for each of the at least two wireless communication devices using a header portion of each packet (step 325). Thus, when the second type of user data is voice information, the present invention allows the transmission of distinct voice information for a number of wireless communication devices within the same downlink user data packet and/or sub-channel.

Returning now to step 310, for the first type of user data, logic 216 identifies wireless communication devices of each of the first type of user data (step 330), and allocates at least one entire sub-channel for the first type of user data for each wireless communication device (step 335). Logic 220 forms packets for the first type of data that include only user data for one wireless communication device (step 340).

Once base station 200 has accumulated enough user data packets to fill an entire downlink frame, logic 222 forms the downlink frame, and includes a portion of the downlink frame notifying wireless communication devices that user data packets are going to be transmitted to them, and also includes the user data packets in the downlink frame (step 345). Referring now to FIG. 1, the notification can be included in the DL-MAP portion of the downlink frame. Depending upon the particular implementation, the notification can be included in a downlink frame preceding the frame containing the packet, or within the same downlink frame carrying the data packet. Logic 224 then controls the transmission of the downlink frame to the wireless communication devices via transceiver 205 (step 350).

Figure 4:
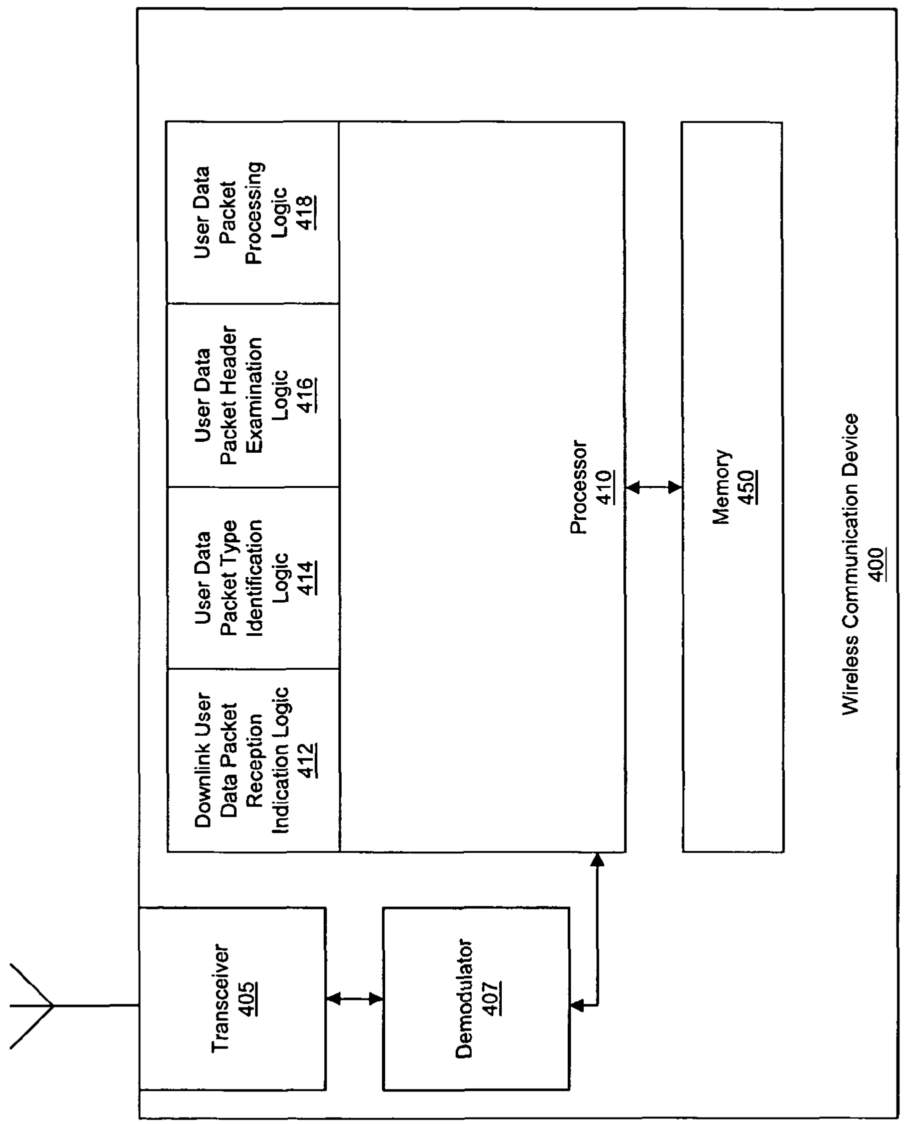
FIG. 4 is a block diagram of an exemplary wireless communication device in accordance with the present invention.

FIG. 4 is a block diagram of an exemplary wireless communication device in accordance with the present invention. Wireless communication device 400 includes transceiver 405 coupled to an antenna for transmitting and receiving communications with wireless communication devices. Transceiver 405 is also coupled to demodulator 407. Demodulator 407 is coupled to processor 410, which is in turn coupled to memory 450. Processor 410 includes logic 412-418, which will be described in more detail below in connection with FIG. 5. Processor 405 can be any type of processor, such as a microprocessor, field programmable gate array (FPGA) and/or an application specific integrated circuit (ASIC). When processor 410 is a microprocessor then logic 412-418 can be processor-executable code loaded from memory 450. It will be recognized that FIG. 4 is a simplified diagram of the wireless communication device, and the wireless communication device can include other components, such as modulators, downconverters, upconverters, digital-to-analog converters, analog-to-digital converters, etc.

Figure 5:
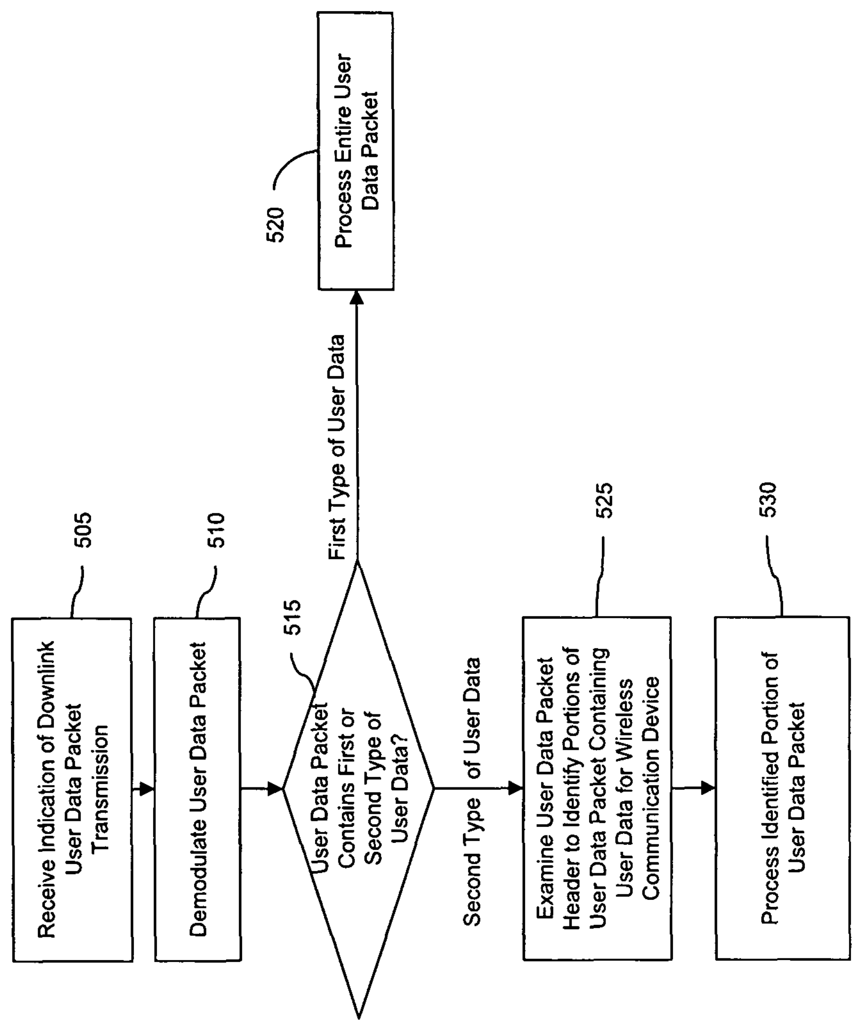
FIG. 5 is a flow diagram of an exemplary method of receiving information in accordance with the present invention.

FIG. 5 is a flow diagram of an exemplary method of receiving information in accordance with the present invention. Initially, logic 412 receives an indication of a downlink packet transmission from base station 200 via transceiver 405 (step 505). Again, this indication can be included in the DL-MAP portion of the current or previous downlink frame. Demodulator 407 then demodulates the identified packet (step 510) and logic 414 identifies whether the packet contains first or second type of user data (step 515). This identification can be performed using information from the received indication of a downlink packet transmission, and/or by an examination of the packet header. When the packet contains the first type of user data, logic 418 processes the entire packet in a conventional manner (step 520). When, however, the packet contains the second type of user data, logic 416 examines the packet header to identify the portions of the packet containing user data for the wireless communication device (step 525) and logic 418 processes the identified portion of the packet to extract the user data (step 530).

Although exemplary embodiments have been described above in connection with providing voice information for a number of wireless communication devices in a single packet, the present invention can also be employed to provide data information for a number of wireless communication devices within a single packet and/or sub-channel.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of wirelessly transmitting user data, the method comprising: selecting a plurality of wireless communication devices for a user data packet; including distinct user data for each of the plurality of wireless communication devices in the user data packet; identifying portions of the user data packet including the user data for each of the plurality of wireless communication devices; and transmitting the user data packet over a wireless air interface, notifying each of the plurality of wireless communication devices that the user data packet is being transmitted, wherein the notification is in a frame preceding a frame that carriers the user data packet.

2. The method of claim 1, wherein a header portion of the user data packet identifies the portions of the user data packet including the user data for each of the plurality of wireless communication devices.

3. The method of claim 1, further comprising:

notifying each of the plurality of wireless communication devices that the user data packet is being transmitted.

4. The method of claim 3, wherein the notification is in a same frame that carries the user data packet.

5. The method of claim 1, wherein the packet is transmitted by being spread across a number of non-adjacent frequencies.

6. The method of claim 1, wherein the user data is voice information.

7. The method of claim 6, wherein the voice information is formatted according to Voice over Internet Protocol (VoIP).

* * * * *